United States Patent
Abrams et al.

(10) Patent No.: US 10,838,918 B2
(45) Date of Patent: Nov. 17, 2020

(54) PRESERVATION OF REFERENTIAL INTEGRITY

(75) Inventors: Zachary W. Abrams, Durham, NC (US); Paula Besterman, Cary, NC (US); Pamela S. Ross, Raleigh, NC (US); Eric Woods, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 13/596,255

(22) Filed: Aug. 28, 2012

(65) Prior Publication Data

US 2014/0068480 A1   Mar. 6, 2014

(51) Int. Cl.
  *G06F 16/16*   (2019.01)
  *G06F 3/0486*  (2013.01)
  *G06F 3/048*   (2013.01)

(52) U.S. Cl.
  CPC ............. *G06F 16/16* (2019.01); *G06F 3/048* (2013.01); *G06F 3/0486* (2013.01)

(58) Field of Classification Search
  CPC ......... G06F 3/0486; G06F 16/16; G06F 3/048
  USPC ......................................................... 715/769
  See application file for complete search history.

(56) References Cited

U.S. PATENT DOCUMENTS

| | | | |
|---|---|---|---|
| 6,784,925 B1 * | 8/2004 | Tomat et al. | ............ 348/207.11 |
| 6,874,004 B2 | 3/2005 | Jolly | |
| 7,032,124 B2 | 4/2006 | Greenbaum | |
| 7,634,471 B2 | 12/2009 | Chen et al. | |
| 7,660,876 B2 | 2/2010 | Mangalvedhekar | |
| 8,005,847 B2 | 8/2011 | Levy et al. | |
| 8,495,099 B2 * | 7/2013 | Maim | ................. G06F 17/2211 707/695 |
| 2001/0039553 A1 | 11/2001 | Lamarca et al. | |
| 2002/0158909 A1 * | 10/2002 | Negishi | ................. G06F 3/0481 715/769 |
| 2003/0051068 A1 * | 3/2003 | Eldridge | ................. G06F 9/465 719/318 |
| 2004/0249863 A1 * | 12/2004 | Kawamura | ....... G06F 17/30569 |
| 2007/0050726 A1 * | 3/2007 | Wakai | ................... G06F 3/0486 715/769 |
| 2007/0271524 A1 * | 11/2007 | Chiu et al. | ..................... 715/767 |
| 2009/0222115 A1 * | 9/2009 | Malcolm | ........... G06F 17/30749 700/94 |
| 2010/0149096 A1 * | 6/2010 | Migos | ................... G06F 3/0425 345/158 |

(Continued)

OTHER PUBLICATIONS

Moving and Copying Java Elements. Linuxtopia. http://www.linuxtopia.org/online_books/eclipse_documentation/eclipsejava_development_guide/topic/org.eclipse.jdt.doc.user/gettingStarted/eclipse_java_qs-10.htm. Retrieved Apr. 30, 2012.

*Primary Examiner* — Sherrod L Keaton
(74) *Attorney, Agent, or Firm* — Mollborn Patents, Inc.; Fredrik Mollborn

(57) ABSTRACT

Methods and apparatus, including computer program products and a computer system, implement and use techniques for preserving referential integrity. A first input receiving component receives a first input selecting a target file within a first directory. A second input receiving component receives a second input selecting all files referenced by the target file. A transfer component automatically performs a moving or copying operation of all referenced files from a first directory to a second directory when a moving or copying operation of the target file is performed.

7 Claims, 5 Drawing Sheets

(56) References Cited

U.S. PATENT DOCUMENTS

2010/0281178 A1* 11/2010 Sullivan .................. H04N 7/24
                                                    709/231
2013/0076651 A1*  3/2013 Reimann ............... G06F 3/0485
                                                    345/173

* cited by examiner

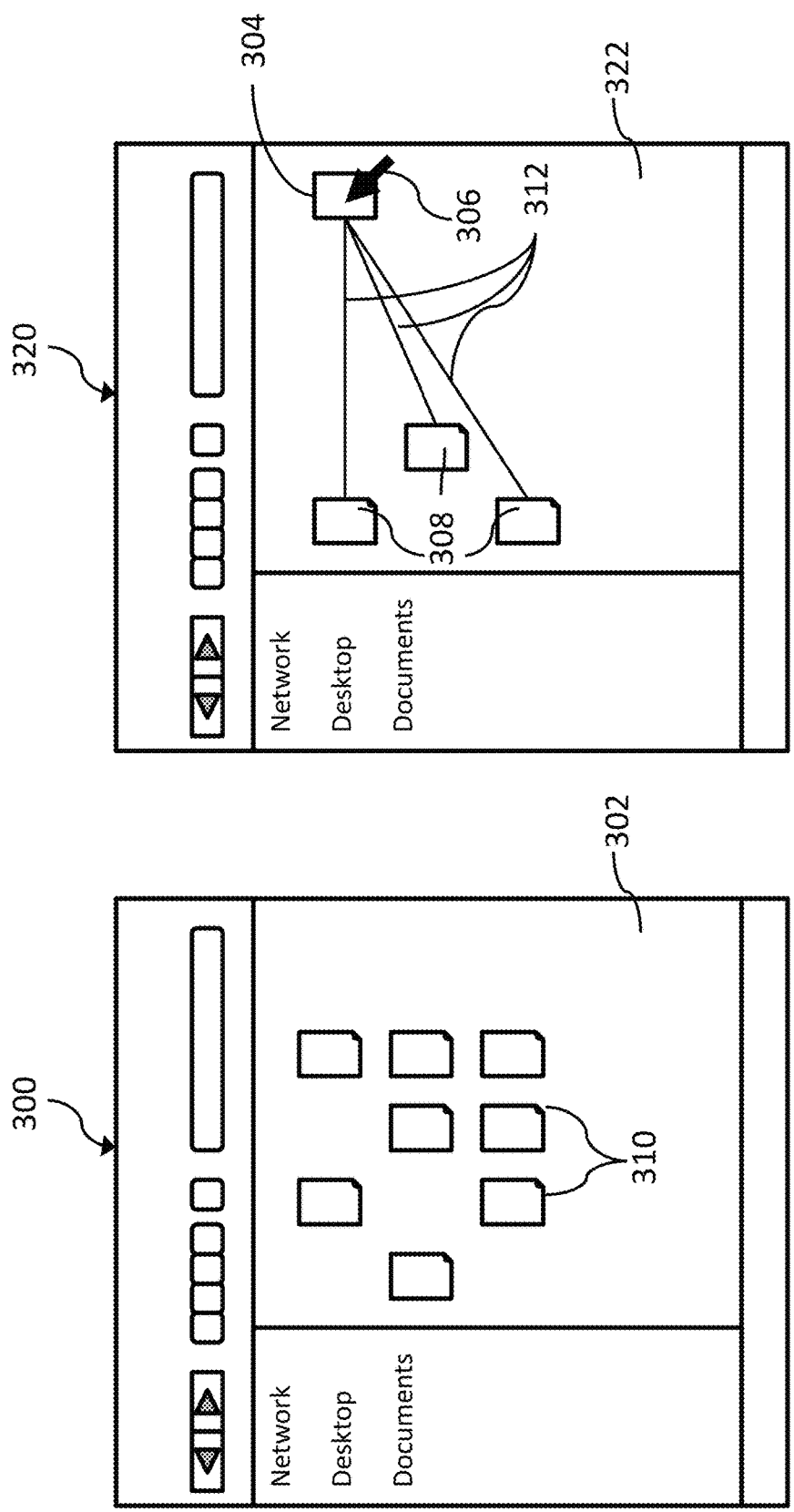

PRESERVATION OF REFERENTIAL INTEGRITY

BACKGROUND

The present invention relates to techniques for maintaining referential integrity of files. Frequently, a file refers to one or more other files. Such a reference causes the one or more other files to open in response to the opening of a file referring thereto.

It is common knowledge that files may be moved or copied from one directory to another. To move or copy multiple files, a user typically holds down a keyboard button such as the 'Ctrl' key while individually selecting each file. Alternatively, the user may select all files and then perform the move/copy operation. Known systems today are mostly agnostic to referential relationships that may exist among the files, particularly during move or copy operations. Thus, it is necessary for the user to manually specify these relationships by individually selecting related files.

As an example, camera video files each have an associated .HTML file which stores additional metadata about the video. If a user offloads media from a camera to a computer, when the video file is moved the video file, the .HTML file loses sight of its associated video file because they are no longer co-located in the same directory. To maintain referential integrity, the user must manually select the .HTML file and the video file and move them together.

There are a few mechanisms for preserving relationships between files in particular circumstances. The software development environment Eclipse™ (Eclipse™ is a registered trademark of the Eclipse Foundation, Inc.) includes a "Move" or "Rename" feature which, when a source code file is moved or renamed, updates references to the file in other source code files. Other systems exist to abstract physical document layouts from depending applications by forming a dynamic collection of linked files. These systems rely on a tagging mechanism to support the dynamic collection. Essentially, the physical layout of the files are masked for a dependent application.

Thus, there is a need for a simplified system for preserving referential integrity between files during move or copy operations while reassuring the user that files related to a moved or copied file are also moved or copied.

SUMMARY

In one aspect, the present invention, provides methods and apparatus, including computer program products and a computer system, implementing and using techniques for preserving referential integrity. A first input selecting a target file within a first directory is received. A second input automatically selecting all files referenced by the target file is received. One of a moving operation and a copying operation from the first directory to the second directory is performed on the target file. A corresponding moving or copying operation of all referenced files to the second directory is automatically performed.

The details of one or more embodiments of the invention are set forth in the accompanying drawings and the description below. Features and advantages of the various embodiments of the invention will be apparent from the description and drawings, and from the claims.

DESCRIPTION OF THE DRAWINGS

FIG. 5 illustrates an exemplary graphical user interface at a third, still later step of a referential integrity preserving method in accordance with an embodiment of the present invention.

DETAILED DESCRIPTION

Figure 1:
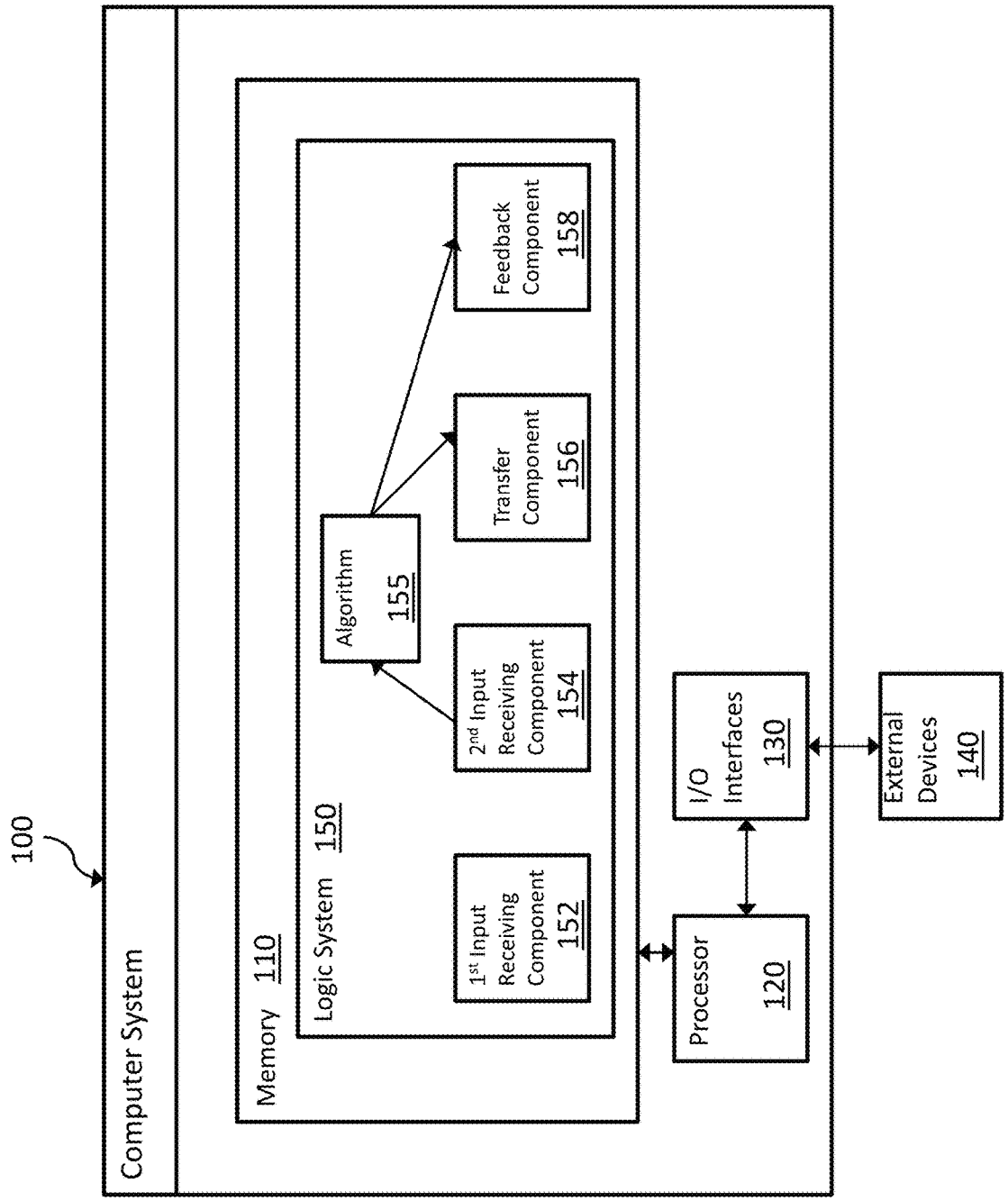
FIG. 1 illustrates a schematic of an exemplary computer system for preserving referential integrity in accordance with an embodiment of the present invention.

Disclosed is a method of maintaining referential integrity among linked files by automatically selecting the linked files when a file is moved or copied, such that the linked files remain grouped.

The invention can be implemented to include one or more of the following advantages. Files having a referential relationship remain grouped when one of the files among the related files is moved or copied from a first directory to a second directory. By automatically selecting and moving/copying any other linked or related files from the first directory to the second directory, a user need not individually keep track of and select related files for moving or copying operations, which is required in the above-mentioned methods. As a result, the accuracy of moving/copying operations is much improved compared to existing techniques, while at the same time the operations are much simpler to perform for the user.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a computer system 100 for preserving referential integrity of files is depicted, which includes a processor 120, a memory 110 and a logic system 150 integrated within memory 110. A first component 152 of logic system 150 is capable of receiving a first input to select a target file within a first directory. A second component 154 of logic system 150 is capable of receiving a second input to select all files referenced by the target file.

First component 152 is reactive to input from a user through one or more input/output interfaces 130 which input may be an action from an external device 140 such as a click of a mouse button with a pointer hovering over an icon depicting the target file or touching the same icon with a user finger or stylus on a touch-activated display. In some embodiments, input to first component 152 may include one or more gestures performed by the user and interpreted by processor 120 after presentation thereto by input/output interfaces 130.

Second component 154 is reactive to input from a user through one or more input/output interfaces 130 which input may be an action such as depressing and holding of a keyboard button, for example, an 'ALT' key. This depression and holding of a keyboard button may occur during selection of the icon representing the target file or may take place during a moving, copying or renaming operation after the selection of the target file. In some embodiments, input to second component 154 may include one or more gestures performed by the user and interpreted by processor 120 after presentation thereto by input/output interfaces 130. Second component 154 is also capable of providing a signal to algorithm 155 to establish any referential relationship between the target file and one or more other files.

After receipt of a signal from second component 154, algorithm 155 may then pass along, to transfer component 156 and feedback component 158, information regarding established referential relationships which may include but are not limited to identifiers of any related one or more other files. Such algorithms are known in the art and may include different definitions for what conditions must exist to establish a referential relationship among files. In some embodiments, algorithm 155 may also establish second or greater level of referential relationship. For example algorithm 155 may establish files having a referential relationship with a target file also have a further referential relationship with one or more additional files.

While depicted as receiving input solely from second component 154, algorithm 155 may require receipt of a signal from both first 152 and second components 154 in some embodiments. In some embodiments, algorithm 155 may be a component of the operating system of computer system 100 while in other embodiments, algorithm 155 may be an independent application running on computer system 100.

A transfer component 156 of computer system 100 alternatively moves or copies the target file from the first directory to a second directory such that all referenced files established by algorithm 155 also move or copy to the second directory. Transfer component 156 may be responsive to dragging an icon representing the target file from the first directory to the second directory. The dragging may, in turn, be caused by moving a mouse pointer or moving a fingertip or stylus across a touch-activated display while engaged with the icon representing the target file. Alternatively, dragging may be caused by a user gesture interpreted by processor 120.

The system's feedback generation component 158 provides feedback to the user confirming preservation of referential integrity between the target file and the referenced files. Feedback generation component 158 may provide feedback in response to user input to second input component 154 and referenced file establishment by algorithm 155. In a preferred embodiment, the feedback comprises visual feedback in the form of a pointed web including one or more linking lines between an icon representing the target file and icons representing each referenced file.

Preferably, the pointed web continues to display the referential relationship between the target file and the referenced files during a move, copy or rename operation to assure the user that the referenced files are being moved or copied with the target file or will be provided with updated references to a renamed target file.

Figure 2:
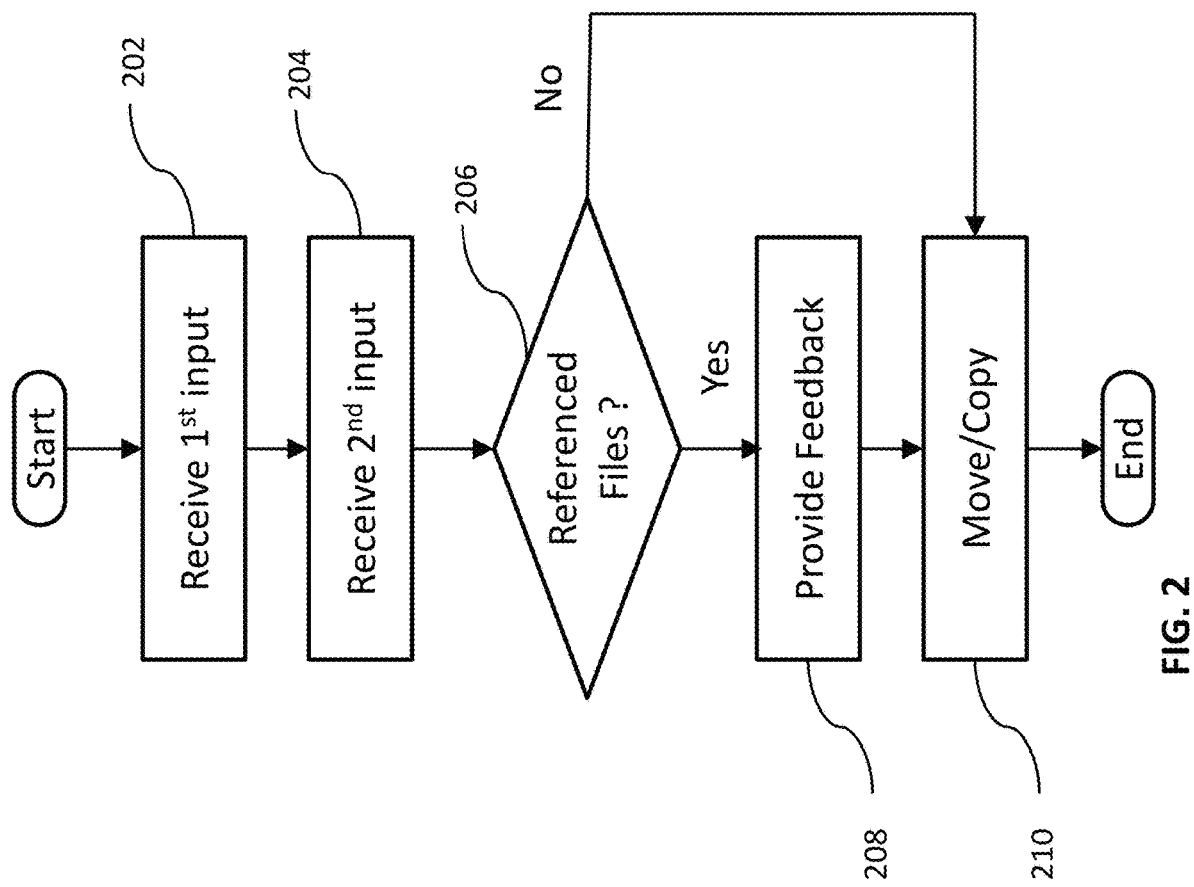
FIG. 2 illustrates an exemplary flow diagram of a method of preserving referential integrity in accordance with an embodiment of the present invention.

A method 200 of preserving referential integrity during a move, copy or rename operation using the system in accordance with an embodiment of the present invention is generally depicted in FIG. 2. To begin, a computer system 100 such as that depicted in FIG. 1 receives an input selecting a target file (Step 202). As mentioned above, this input may be provided to computer system 100 by a user clicking a mouse button when a mouse pointer is superimposed on an icon of the target file or by a variety of other actions. To additionally select any files referenced by the target file, a second input is also received (Step 204). In one embodiment, the second input is provided by a user while selecting the target file. In an alternative embodiment, the user may provide the second input after selection of the target file and during a moving or copying operation of a target file from a first directory to a second directory.

Upon receipt of the second input, an algorithm, such as algorithm 155 described above, establishes whether the target file references any other files (Step 206). If the algorithm determines one or more files are referenced by the target file, these files are selected along with the target file and the user is provided with feedback (Step 208) indicating the referential relationship between the target file and the one or more referenced files.

If the algorithm determines no files are referenced by the target file, only the target file is selected in response to receipt of the first input. In a preferred embodiment, no active feedback is presented to the user but the absence of feedback indicating a referential relationship between the target file and one or more referenced files, by default, indicates to the user that the target files is independent and has no referential relationships. In an alternate embodiment, feedback that no files have a referential relationship with the target may be provided as, for instance, a small message window or message in a header, footer or sidebar of an open window such as a file management window.

Finally, with referential relationships established by an algorithm such as 155, the user performs a move or copy operation (Step 210) as they would regardless of the existence of any referenced files. Feedback continues to be provided to the user during the operation to indicate moving or copying of the referenced files along with the target file.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
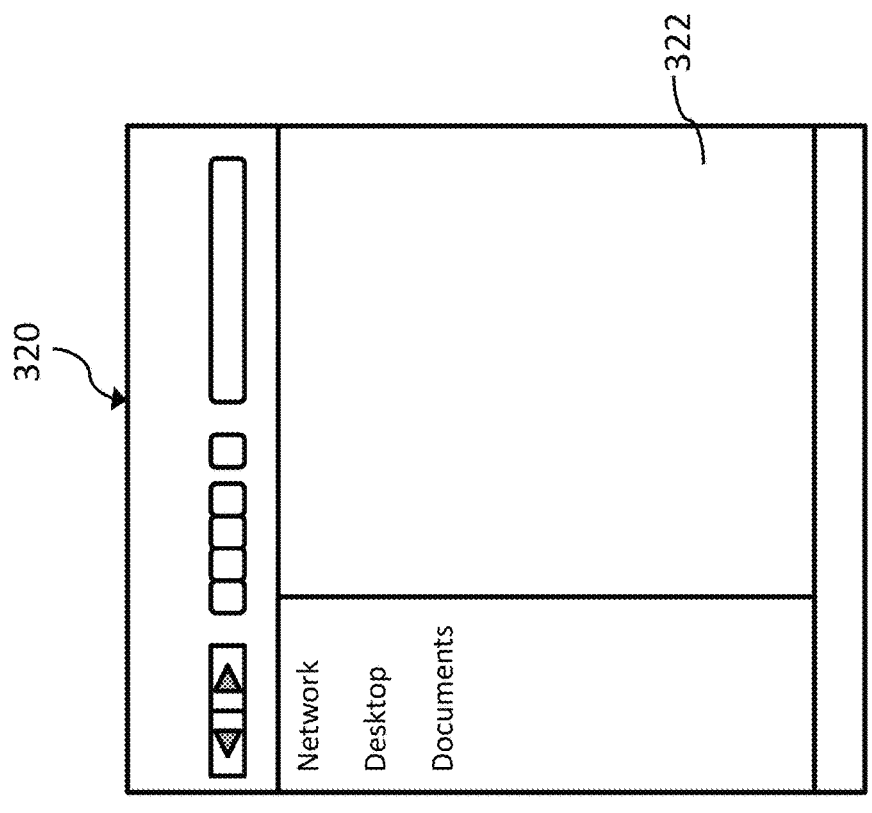
FIG. 3 illustrates an exemplary graphical user interface at one step of a referential integrity preserving method in accordance with an embodiment of the present invention.
Figure 3:
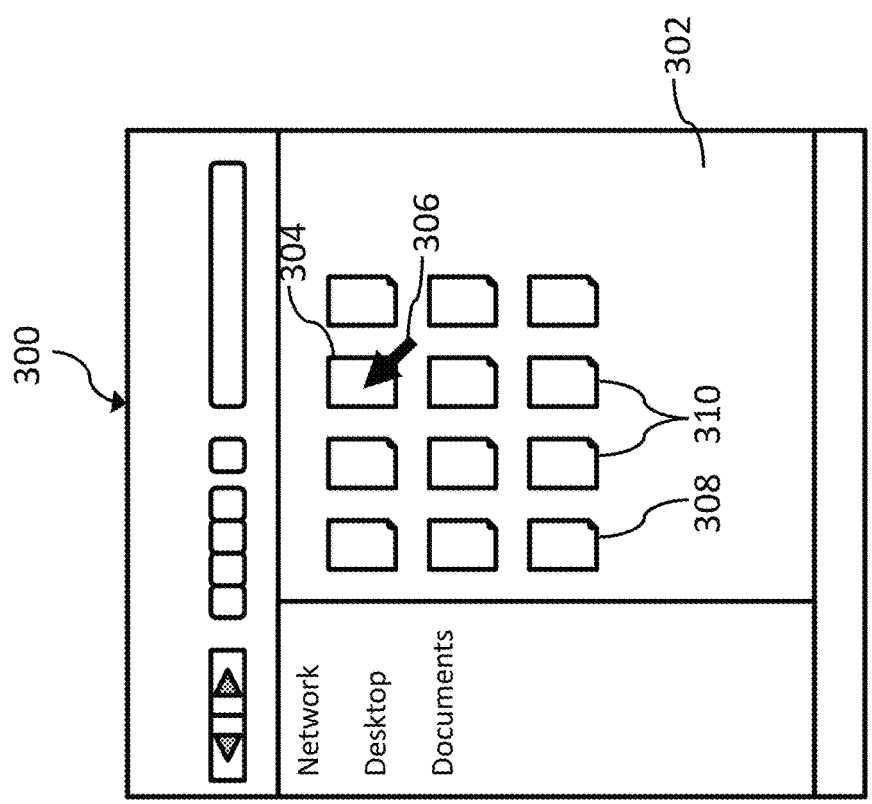
Figure 4:
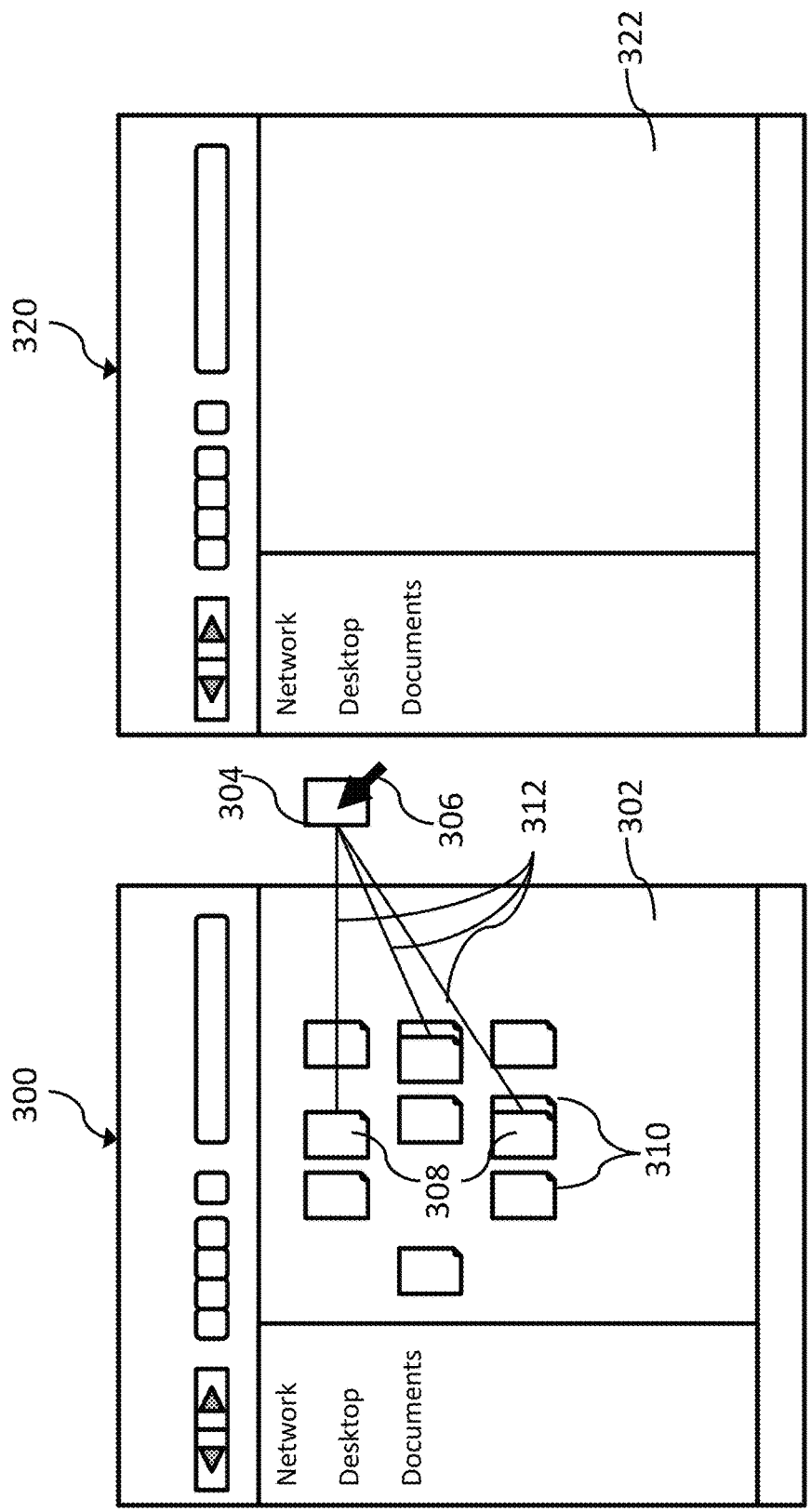
FIG. 4 illustrates an exemplary graphical user interface at second, later step of a referential integrity preserving method in accordance with an embodiment of the present invention.

A process for selecting, moving and copying a target file and a number of referenced files in accordance with one embodiment is depicted in an exemplary graphical user interface in FIGS. 3-5. FIG. 3 shows two windows 300 and 320. A first directory 302 is presented within window 300 and contains several files 304, 308 and 310. Target file 304 has been selected by the user with pointer 306 for moving to second directory 322 presented within window 320. Though not depicted as such in FIG. 3, one or more files including file 308, for example, reference or are referenced by target file 304 while files 310 have no referential relationship to target file 304.

Because the user would like to preserve grouping and the referential integrity between target file 304 and any files related thereto, the user provides a second input to the system. For example, the user depresses and holds an 'ALT' key while selecting target file 304. In response to this second input, feedback in the form of a pointed web 312 is presented to the user as target file 304 is dragged from first directory 302 to second directory 322 as shown in FIG. 4. Lines at 312 are displayed to the user between the target file 304 and related files 308. No link lines are directed towards independent files 310.

Finally, FIG. 5 shows that target file 304 along with three referenced files 308 have been moved to second directory 322. Pointed web 312 emphasizes the maintained referential relationship and grouping for confirmation to the user. Feedback by pointed web 312 may be presented in a similar fashion during copying or renaming operations (not pictured).

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed is:

1. A computer-implemented method, comprising:
in response to selecting, on a graphical user interface, an icon representing a target file within a first directory, determining by a processor either that there are any files within the first directory which are used by the target file and are to remain grouped with the target file, or that there are no files within the first directory which are used by the target file and are to remain grouped with the target file;
in response to determining by the processor that there are no files within the first directory which are used by the target file and are to remain grouped with the target file, providing a message indicating that there are no files within the first directory which are used by the target file;
in response to determining by the processor that there are one or more files within the first directory which are used by the target file and are to remain grouped with the target file, automatically drawing a pointed web on the graphical user interface, the pointed web indicating one or more linking lines between the icon representing the target file and one or more icons representing the one or more files that are to remain grouped with the target file; and in response to dragging the selected icon to a second directory, automatically dragging the pointed web and the grouped icons into the second directory, wherein the pointed web is continuously displayed until the selected icon along with the grouped icons, and the files represented by the icons, have been placed into the second directory.

2. The method of claim 1, wherein dragging the icon representing the target file from the first directory into the second directory represents moving or copying the target file into the second directory.

3. The method of claim 1, wherein automatically dragging the pointed web and the icons representing the one or more files into the second directory represents moving or copying one or more files into the second directory.

4. A computer program product comprising a non-transitory computer readable storage medium having program code embodied therewith, the program code being executable by a processor to perform a method comprising:

in response to selecting, on a graphical user interface, an icon representing a target file within a first directory, determining by a processor either that there are any files within the first directory which are used by the target file and are to remain grouped with the target file, or that there are no files within the first directory which are used by the target file and are to remain grouped with the target file;

in response to determining by the processor that there are no files within the first directory which are used by the target file and are to remain grouped with the target file, providing a message indicating that there are no files within the first directory which are used by the target file;

in response to determining by the processor that there are one or more files within the first directory which are used by the target file and are to remain grouped with the target file, automatically drawing a pointed web on the graphical user interface, the pointed web indicating one or more linking lines between the icon representing the target file and one or more icons representing the one or more files that are to remain grouped with the target file; and in response to dragging the selected icon to a second directory, automatically dragging the pointed web and the grouped icons into the second directory, wherein the pointed web is continuously displayed until the selected icon along with the grouped icons, and the files represented by the icons, have been placed into the second directory.

5. The computer program product of claim 4, wherein dragging the icon representing the target file from the first directory into the second directory represents moving or copying the target file into the second directory.

6. The computer program product of claim 4, wherein automatically dragging the pointed web and the icons representing the one or more files into the second directory represents moving or copying the one or more files into the second directory.

7. A system, comprising:

a processor; and a memory containing instructions that when executed by the processor cause the processor to perform a method comprising:

in response to selecting, on a graphical user interface, an icon representing a target file within a first directory, determining either that there are any files within the first directory which are used by the target file and are to remain grouped with the target file, or that there are no files within the first directory which are used by the target file and are to remain grouped with the target file;

in response to determining that there are no files within the first directory which are used by the target file and are to remain grouped with the target file, providing a message indicating that there are no files within the first directory which are used by the target file;

in response to determining that there are one or more files within the first directory which are used by the target file and are to remain grouped with the target file, automatically drawing a pointed web on the graphical user interface, the pointed web indicating one or more linking lines between the icon representing the target file and one or more icons representing the one or more files that are to remain grouped with the target file; and in response to dragging the selected icon to a second directory, automatically dragging the pointed web and the grouped icons into the second directory, wherein the pointed web is continuously displayed until the selected icon along with the grouped icons, and the files represented by the icons, have been placed into the second directory.

\* \* \* \* \*